(12) United States Patent
Terada

(10) Patent No.: US 7,104,259 B2
(45) Date of Patent: Sep. 12, 2006

(54) DIAGNOSTIC DEVICE FOR EXHAUST GAS RECIRCULATION SYSTEM

(75) Inventor: Hiroki Terada, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/085,176

(22) Filed: Mar. 22, 2005

(65) Prior Publication Data

US 2005/0210970 A1 Sep. 29, 2005

(30) Foreign Application Priority Data

Mar. 26, 2004 (JP) ............................. 2004-093478

(51) Int. Cl.
*F02M 25/07* (2006.01)
*G01M 15/00* (2006.01)

(52) U.S. Cl. .................................. 123/568.16; 73/118.1

(58) Field of Classification Search ........... 123/568.11, 123/568.16, 568.21; 73/117.3, 118.1, 118.2; 701/103, 108

See application file for complete search history.

(56) References Cited

U.S. PATENT DOCUMENTS

| | | | | |
|---|---|---|---|---|
| 5,349,936 A | * | 9/1994 | Uchinami | 123/568.16 |
| 5,368,005 A | * | 11/1994 | Kako | 123/568.16 |
| 5,513,616 A | * | 5/1996 | Matsumoto et al. | 123/568.16 |
| 5,540,091 A | * | 7/1996 | Nakagawa | 73/117.3 |
| 5,635,633 A | * | 6/1997 | Kadota | 73/118.1 |
| 5,675,080 A | * | 10/1997 | Wada | 73/118.1 |
| 6,856,890 B1 | * | 2/2005 | Muto et al. | 701/108 |
| 2005/0199216 A1 | * | 9/2005 | Matsumoto | 123/568.16 |

FOREIGN PATENT DOCUMENTS

JP 08-082253 3/1996

* cited by examiner

*Primary Examiner*—Willis R. Wolfe, Jr.
(74) *Attorney, Agent, or Firm*—Smith, Gambrell & Russell, LLP

(57) ABSTRACT

A failure diagnostic device for an exhaust gas recirculation (EGR) apparatus, which can detect an intake pipe pressure at a high accuracy with a simple control and can prevent false diagnosis of an EGR system. If at least either one of first and second off-mode intake pipe pressures $P_{1off}$, $P_{2off}$ exceeds a cancel determination value K, an ECU determines that the intake pipe pressures $P_{1off}$, $P_{on}$ and $P_{2off}$ are not properly detected, and cancels the failure diagnosis of the EGR system. Therefore, the false diagnosis of the EGR system can be avoided with a simplified process without requiring specific determinations on individual abnormal states of the various components other than the EGR system. By setting the cancel determination value K based on the intake pipe pressure P resulting when EGR off-control is executed in a state of an EGR valve being stuck in a fully-open position, each improperly-detected intake pipe pressure can be excluded with reliability.

4 Claims, 4 Drawing Sheets

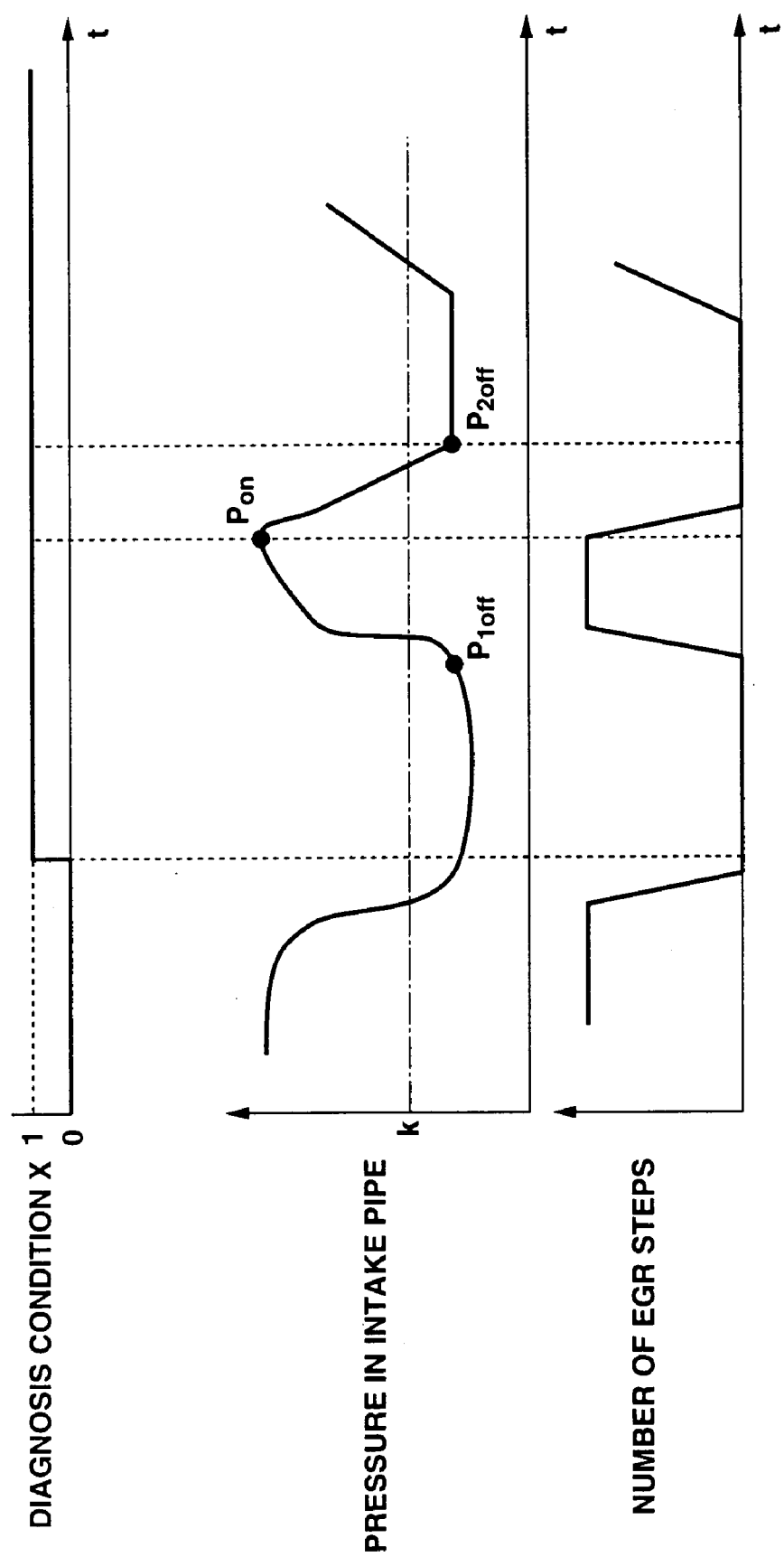

DIAGNOSTIC DEVICE FOR EXHAUST GAS RECIRCULATION SYSTEM

This application claims benefit of Japanese Application No. 2004-93478 filed on Mar. 26, 2004, the contents of which are incorporated by this reference.

BACKGROUND OF THE INVENTION

1. Field of the Invention

The present invention relates to a failure diagnostic device for an exhaust gas recirculation (EGR) system, which determines an occurrence of a failure based on a differential pressure of intake air pressures in an intake pipe disposed downstream of a throttle valve between a passage-opening control and a passage-closing control of a recirculation pipe through which exhaust gases are returned to the intake pipe.

2. Description of the Related Art

Hitherto, EGR systems have been widely used in an internal combustion engine for reducing NOx (nitrogen oxides) emissions in exhaust gases. In those types of the EGR systems, a portion of the exhaust gas is returned to an intake pipe through a recirculation pipe, whereby inert gas components in an air-fuel mixture are increased to lower a combustion temperature. Accordingly, if there occurs such a trouble as a blockage of the recirculation pipe or an operation failure of an EGR control valve disposed in the recirculation pipe, a problem arises in, for example, that an air-fuel ratio becomes abnormal. As a result, a combustion is brought into an unstable state and a degradation of exhaust gas emissions is caused.

As one of techniques for detecting a failure of the EGR system, Japanese Unexamined Patent Application Publication No. 8-82253, for example, discloses a technique of detecting a pressure change in an intake pipe downstream of the throttle valve, thereby determining whether or not the EGR system is failed. More specifically, according to the disclosed technique, when diagnosis run (or executing) conditions are satisfied, the intake pipe pressure during an open state of an EGR valve is detected plural times. Then, the EGR valve is closed and the intake pipe pressure during the closed state of the EGR valve is detected for plural times. A diagnosis value is computed from an average value of the intake pipe pressures during the open state of the EGR valve and the average value of the intake pipe pressures during the closed state of the EGR valve. Then, a failure of the EGR system is determined if a computed diagnosis value is deviated from a value for the determination of a normal state. In such a process, to prevent false diagnosis of the EGR system with a higher reliability, the diagnosis is ceased (cancelled) and the detected values are discarded, for example, when such operation conditions as a throttle opening degree and an engine speed are changed in excess of respective predetermined thresholds, or when the difference between an atmospheric pressure and each detected intake pipe pressure is not larger than a predetermined value.

In the above-described technique, however, to cancel the diagnosis as appropriate for a purpose of improving a measurement accuracy of the intake pipe pressure, various cancel conditions must be individually determined in specific manners. Therefore, the process for the failure diagnosis is more complicated.

Also, when control errors are caused in various kinds of engine controls and so on due to, e.g., a failure of any other components than the EGR system, there is a risk that the diagnosis cannot be properly cancelled. Such a case may lead to a risk that the detected value of the intake pipe pressure becomes an improper value and a false diagnosis result is determined.

In view of the state of the art set forth above, it is an object of the present invention to provide a failure diagnostic device for the EGR apparatus, which can detect the intake pipe pressure at a high accuracy with a simple control and can prevent the false diagnosis of the EGR system.

SUMMARY OF THE INVENTION

According to the present invention, in a failure diagnostic device for an exhaust gas recirculation (EGR) apparatus equipped with an EGR system in which an EGR valve is disposed in a recirculation pipe interconnecting an exhaust pipe and an intake pipe downstream of a throttle valve, the failure diagnostic device comprises EGR control means for selectively executing an EGR on-control to return exhaust gases from the exhaust pipe to the intake pipe in combination of various kinds of engine controls including a valve-opening control of the EGR valve, and an EGR off-control to cut off a return of the exhaust gas from the exhaust pipe to the intake pipe in combination of various kinds of engine controls including a valve-closing control of the EGR valve; diagnostic means for diagnosing a failure of the EGR system based on an intake pipe pressure during an EGR on-control and an intake pipe pressure during an EGR off-control when diagnosis run conditions are satisfied; and cancellation means for canceling the diagnosis executed by the diagnostic means when the intake pipe pressure during the EGR off-control exceeds a preset cancel determination value.

BRIEF DESCRIPTION OF THE DRAWINGS

FIG. 4 is a time chart for an EGR failure diagnosis.

DESCRIPTION OF THE PREFERRED EMBODIMENTS

Figure 1:
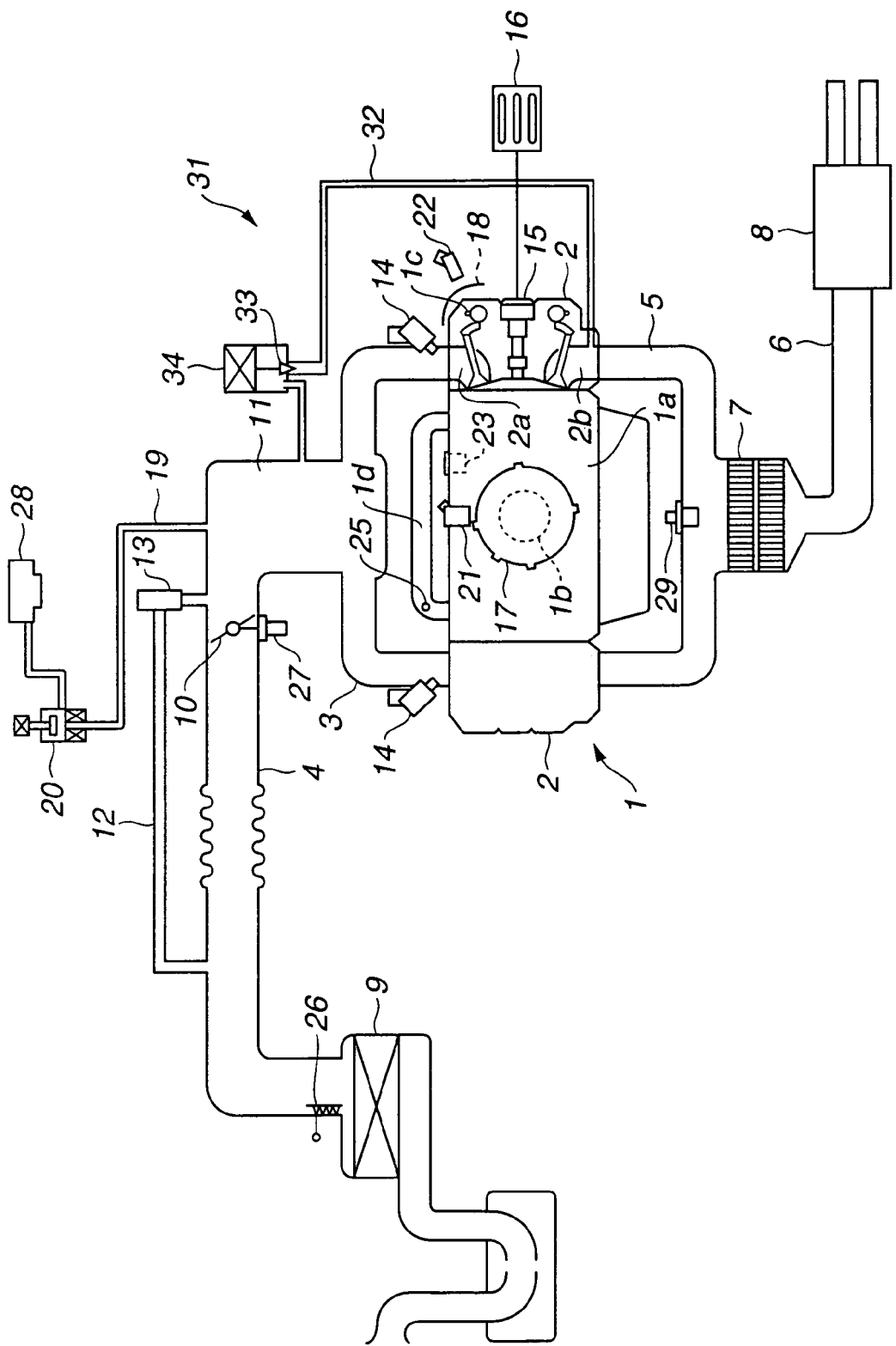
FIG. 1 is a schematic view of an engine control system.
Figure 2:
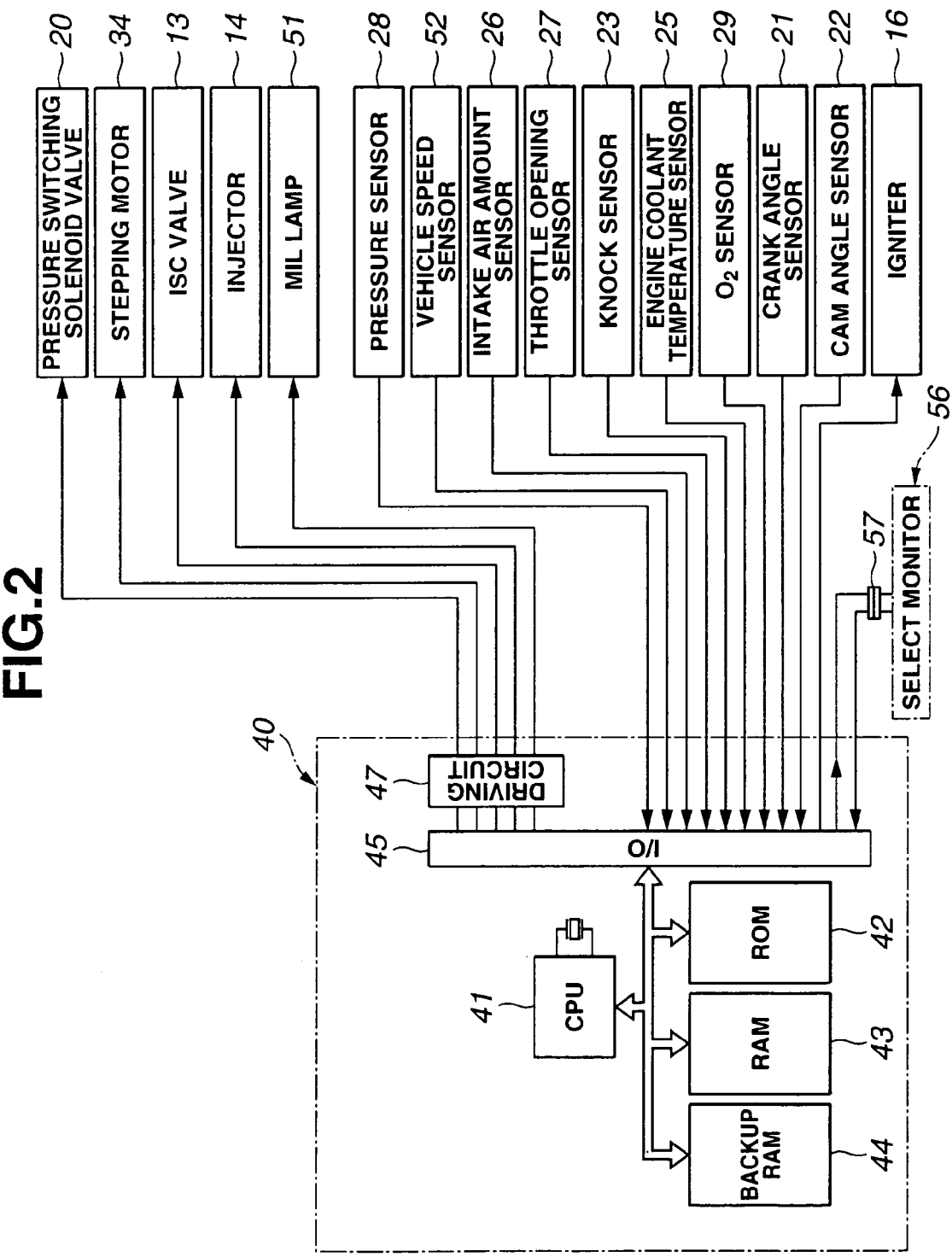
FIG. 2 is a circuit diagram of a control unit.
Figure 3:
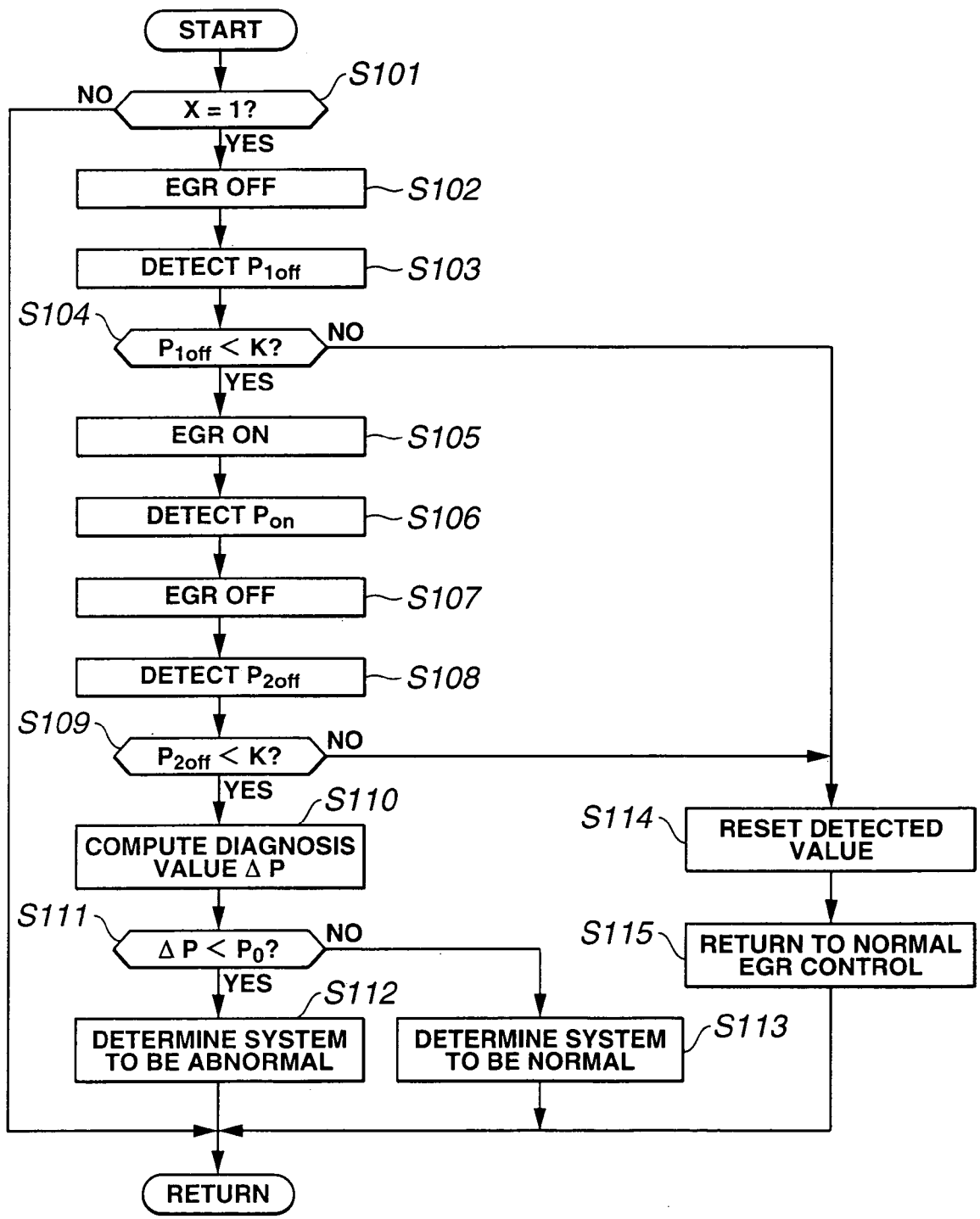
FIG. 3 a flowchart of an EGR failure diagnosis routine.

A preferred embodiment of the present invention will be described below with reference to drawings. The drawings represent one embodiment of the present invention. Of the drawings, FIG. 1 is a schematic view of an engine control system, and FIG. 2 is a circuit diagram of a controller. FIG. 3 a flowchart of an EGR failure diagnosis routine, and FIG. 4 is a time chart for an EGR failure diagnosis.

In FIG. 1, reference numeral 1 denotes an engine that is a horizontally opposed engine in this embodiment. An intake pipe 4 is communicated thorough an intake manifold 3 with an intake port 2a formed in a cylinder head 2 of the engine 1. An air cleaner 9 is attached to an air inlet of the intake pipe 4 at an upstream end, and a throttle valve 10 is disposed midway the intake pipe 4. Further, an air chamber 11 is formed in the intake pipe 4 downstream of the throttle valve 10, and is communicated with the intake manifold 3.

A bypass passage 12 bypassing the throttle valve 10 is connected to the intake pipe 4, and an ISC (Idle Speed Control) valve 13 is disposed in the bypass passage 12. A fuel injector 14 corresponding to each cylinder is disposed at a downstream end of each intake manifold 3. Further, an ignition plug 15 is attached to a cylinder head 2 such that a fore end of the ignition plug 15 is positioned in a combustion chamber of each cylinder. The ignition plug 15 is connected to an igniter 16.

On the other hand, an exhaust pipe 6 is communicated through an exhaust manifold 5 with an exhaust port 2b formed in the cylinder head 2. A catalyst converter 7 is disposed at an upstream end of the exhaust pipe 6, and a muffler 8 is attached to a downstream end of the exhaust pipe 6.

One end of a recirculation pipe 32 constituting an EGR system 31 is communicated with at least one of the exhaust ports 2b, and the other end of the recirculation pipe 32 is communicated with the air chamber 11. An EGR valve 33 for opening and closing the recirculation pipe 32 is disposed midway the recirculation pipe 32. In this embodiment, a stepping motor 34 is provided with the EGR valve 33. The stepping motor 34 is controlled by an engine control unit (ECU) 40 described later, whereby the EGR valve 33 sets an EGR amount as required.

The arrangement of various sensors used in an engine control system will be described below. A crank angle sensor 21 is disposed in an opposed relation to a crank rotor 17 coupled to a crankshaft 1b of the engine 1. Also, a cam angle sensor 22 is disposed in the opposed relation to a cam rotor 18 coupled to a camshaft 1c.

A knock sensor 23 is fixed to a cylinder block 1a of the engine 1, and an engine coolant temperature sensor (or a thermometer) 25 is disposed in a coolant passage 1d. A throttle opening degree sensor 27 is coupled to the throttle valve 10, and a pressure sensor 28, e.g., an absolute pressure sensor as one example of means for detecting an intake pipe pressure, is disposed to be communicated with the air chamber 11 through a pressure passage 19. Further, a pressure switching solenoid valve 20 is disposed in the pressure passage 19. With switching operations of the pressure switching solenoid valve 20, the pressure sensor 28 selectively detects one of the intake pipe pressure in the air chamber 11 and the atmospheric pressure. In addition, an $O_2$ sensor 29 is disposed so as to position in a connecting section of the exhaust manifolds 5.

As shown in FIG. 2, the ECU 40 is structured of mainly a microcomputer comprising a CPU 41, a ROM 42, a RAM 43, a backup RAM 44, and an I/O interface 45, which are interconnected via a bus line.

Connected to input ports of the I/O interface 45 are the various sensors, such as the pressure sensor 28, a vehicle speed sensor 52, the throttle opening degree sensor 27, the knock sensor 23, the engine coolant temperature sensor 25, the $O_2$ sensor 29, the crank angle sensor 21, and the cam angle sensor 22.

On the other hand, the igniter 16 is connected to one output port of the I/O interface 45. Further, various actuators, such as the pressure switching solenoid valve 20, the stepping motor 34, the ISC valve 13, the fuel injector 14, and a MIL lamp 51 for indicating a system malfunction, are connected to other output ports of the I/O interface 45 via a driving circuit 47.

The ECU 40 controls the various actuators in accordance with signals from the corresponding sensors, to thereby perform, as required, various kinds of engine controls, e.g., a fuel injection volume control, an ignition timing control and an EGR valve opening/closing control of the engine 1, as well as various kinds of the failure diagnosis of the engine 1.

Additionally, when a failure occurs, trouble data representing details of the failure, etc. are stored in the backup RAM 44, and the stored data remain kept there even after an ignition switch (not shown) has been turned off. The stored trouble data can be read out by a select monitor 56 connected to the ECU 40 through a connector 57.

The EGR control will be described below in brief.

In the stepping motor 34, the number of steps (EGR step number) ranging, for example, from "0" to "52" is set. Based on detected values from the various sensors, the ECU 40 determines whether EGR conditions are satisfied. When the EGR conditions are satisfied, the stepping motor 34 is controlled to a predetermined EGR step number in the range of "1" to "52", whereby the EGR valve 33 is opened at a predetermined opening degree corresponding to the predetermined EGR step number. On the other hand, when the EGR conditions are not satisfied, the ECU 40 controls the stepping motor 34 to the EGR step number "0", whereby the EGR valve 33 is closed. In such a process, upon switching from the valve-closing control to the valve-opening control of the EGR valve 33, the ECU 40 changes the other engine control states as required (for example, in the engine equipped with such mechanisms as the ignition timing and the variable valve timing, the valve timing is advanced in an EGR on-control mode as compared with that in an EGR off-control mode). Hereinafter, a control allowing a return of the exhaust gas from the exhaust pipe 6 to the intake pipe 4 (actually, the air chamber 11) in combination of the various kinds of the engine controls including the valve-opening control of the EGR valve 33 is referred to as "EGR on-control", and a control cutting off return of the exhaust gas from the exhaust pipe 6 to the intake pipe 4 in combination of the various kinds of engine control including the valve-closing control of the EGR valve 33 is referred to as "EGR off-control".

When the EGR valve 33 is opened, the portion of the exhaust gas is returned to the air chamber 11, and therefore an intake pipe pressure (absolute pressure) P detected by the pressure sensor 28 shows a higher value than that when the EGR valve 33 is closed.

The intake pipe pressure P is lowered not only when the EGR valve 33 is closed with the EGR off-control, but also when the EGR valve 33 is stuck to the valve-opening side in spite of the EGR off-control. In the latter case, the intake pipe pressure P detected by the pressure sensor 28 shows a relatively lower value than that when the EGR on-control is performed and the EGR valve 33 is opened at the same degree of the opening. This is attributable to the fact that the ECU 40 changes the states of the other kinds of engine control (such as the ignition timing and the valve timing) as appropriate upon switching between the valve-opening control and the valve-closing control of the EGR valve 33.

Taking into account of the above-described point, the ECU 40 detects a pressure change in the air chamber 11 between the EGR on-control and the EGR off-control, thereby determining whether the EGR system 31 operates normally or is failed. More specifically, in this embodiment, when the diagnosis run conditions for the EGR system 31 are satisfied, the ECU 40 successively executes the EGR off-control, the EGR on-control and the EGR off-control in turn to detect the intake pipe pressure P in each control mode respectively as a first off-mode intake pipe pressure $P_{1off}$, an on-mode intake pipe pressure $P_{on}$, and a second off-mode intake pipe pressure $P_{2off}$. Then, the ECU 40 computes a differential pressure $\Delta P$ ($=P_{on}-P_{off}$) between an average value $P_{off}$ ($=(P_{1off}+P_{2off})/2$) of the first and second off-mode intake pipe pressures $P_{1off}$, $P_{2off}$ and the on-mode intake pipe pressure $P_{on}$. If the differential pressure $\Delta P$ is lower than a presetted failure determination value $P_0$, the ECU 40 determines that the EGR system 31 is failed, and if the differential pressure ΔP exceeds the failure determination value $P_0$, the ECU 40 determines that the EGR system 31 is normal. Prior to the determination based on the differential pressure ΔP, the ECU 40 checks whether the first and second off-mode intake pipe pressures $P_{1off}$, $P_{2off}$ are each higher than a presetted cancel determination value K. If at least one of the first and second off-mode intake pipe pressures $P_{1off}$, $P_{2off}$ exceeds the cancel determination value K, the failure diagnostic process based on the differential pressure ΔP is canceled. In other words, the ECU 40 has the functions of EGR control means, diagnostic means, and cancellation means.

The term "diagnosis run conditions" used herein implies conditions specifying an operation state suitable for executing the failure diagnosis, and the diagnosis run conditions consist of, by way of example, (1) to (3) given below;
(1) fuel is cut,
(2) the throttle opening is fully closed, and
(3) the engine revolution speed is in the range of, e.g., 1100 rpm to 3000 rpm (in the case of an AT (Automatic Transmission) vehicle, an engine speed range where the lock-up condition is satisfied).

When the ECU 40 determines that the above conditions (1) to (3) are all satisfied, it sets a diagnosis condition proof flag X to "1" based on a determination that a vehicle is currently in an operation state where the intake pipe pressure P can be stably detected. On the other hand, when the ECU 40 determines that at least any of the above conditions (1) to (3) is not satisfied, it sets the diagnosis condition proof flag X to "0". Note that the ECU 40 may determine to satisfy the diagnosis executing conditions when any of the above conditions (1) to (3) is satisfied, or that it may determine to satisfy the diagnosis executing conditions based on any other one or more conditions than the above conditions (1) to (3).

Also, the cancel determination value K is a fixed value presetted on the basis of, e.g., experiments and simulations. For example, the cancel determination value K is setted to the intake pipe pressure resulting when the EGR valve 33 is stuck in a fully-open position (i.e., when the EGR valve 33 is in a fully-open stuck state) in spite of the ECU 40 executing the EGR off-control on the premise that the diagnosis run conditions are satisfied. By setting the cancel determination value K to such a pressure value, if the components other than the EGR system 31 are all normal, the intake pipe pressure P not higher than the cancel determination value K is always detected in the EGR off-control mode regardless of whether the EGR valve 33 is stuck. In other words, if the intake pipe pressure P in the EGR off-control mode exceeds the cancel determination value K, it can be determined that any abnormality (e.g., a malfunction of the ISC valve 13, the malfunction of the throttle valve 10, a zero-point shift of the pressure sensor 28, or a deviation of the atmospheric pressure from the prescribed range) occurs in any of the components other than the EGR system 31.

The failure diagnosis executed by the ECU 40 on the EGR system 31 will be described below with reference to a flowchart of an EGR failure diagnosis routine shown in FIG. 3.

This routine is repeatedly executed at intervals of a predetermined time after turning-on of the ignition switch until a diagnosis result of the EGR system 31 is obtained. When the routine starts, the ECU 40 first determines in step S101 whether or not the current engine operation state satisfies the diagnosis run conditions (i.e., whether the diagnosis condition proof flag X is "1").

Then, if it is determined in step S101 that the diagnosis condition proof flag X is "1" and the current engine operation state satisfies the diagnosis run conditions, the ECU 40 proceeds to step S102. On the other hand, if it is determined in step S101 that the diagnosis condition proof flag X is "0" and the current engine operation state does not satisfy the diagnosis run conditions, the ECU 40 exits the routine immediately.

Coming in step S102 from step S101, the ECU 40 executes the EGR off-control, and then proceeds to step S103 after the lapse of a predetermined delay time setted in advance.

In step S103, the ECU 40 detects the current intake pipe pressure P as the first off-mode intake pipe pressure $P_{1off}$ (see FIG. 4) by the pressure sensor 28. In next step S104, the ECU 40 checks whether or not the first off-mode intake pipe pressure $P_{1off}$ is lower than the cancel determination value K.

If $P_{1off}$<K is determined in step S104, the ECU 40 determines that an abnormal state, such as a malfunction, does not occur in any of the various kinds of engine control and the intake pipe pressure P is properly detected at present, followed by proceeding to step S105.

Coming in step S105 from step S104, the ECU 40 executes the EGR on-control (namely, switches the EGR control mode from the off-control to the on-control), and then proceeds to step S106 after the lapse of a predetermined delay time set in advance. In step S106, the ECU 40 detects the current intake pipe pressure P as the on-mode intake pipe pressure $P_{on}$ (see FIG. 4) by the pressure sensor 28, followed by proceeding to step S107.

In step S107, the ECU 40 executes the EGR off-control (namely, switches the EGR control mode from the on-control to the off-control), and then proceeds to step S108 after the lapse of the predetermined delay time set in advance.

In step S108, the ECU 40 detects the current intake pipe pressure P as the second off-mode intake pipe pressure $P_{2off}$ (see FIG. 4) by the pressure sensor 28. In next step S109, the ECU 40 checks whether the second off-mode intake pipe pressure $P_{2off}$ is lower than the cancel determination value K or not.

If $P_{2off}$<K is determined in step S109, the ECU 40 determines that the abnormal state, such as the malfunction, does not occur in any of the various kinds of engine control and the intake pipe pressure P is properly detected at present, followed by proceeding to step S110. In other words, if $P_{1off}$<K is determined in step S104 and $P_{2off}$<K is determined in step S109, the ECU 40 determines that no abnormality occurs in any of the components other than the EGR system 31 at least during a period from the time of detecting the first off-mode intake pipe pressure $P_{1off}$ to the time of detecting the second off-mode intake pipe pressure $P_{2off}$ and the intake pipe pressures $P_{1off}$, $P_{on}$ and $P_{2off}$ are all properly detected.

Coming in step S110 from step S109, the ECU 40 computes a diagnosis value ΔP ($=P_{on}-((P_{1off}+P_{2off})/2)$) based on the intake pipe pressures $P_{1off}$, $P_{on}$ and $P_{2off}$ that have been detected respectively in steps S103, S106 and S108. Then, the ECU 40 proceeds to step S111.

Coming in step S111 from step S110, the ECU 40 checks whether the diagnosis value ΔP is smaller than the failure determination value $P_0$. If ΔP<$P_0$ is determined in step S111, the ECU 40 proceeds to step S112 and determines that any abnormality occurs in the EGR system 31, followed by exiting the routine. On the other hand, if ΔP≧$P_0$ is determined in step S111, the ECU 40 proceeds to step S113 and determines that the EGR system 31 is normal, followed by exiting the routine.

Further, if $P_{1off} \geq K$ is determined in step S104 or if $P_{2off} \geq K$ is determined in step S109, the ECU 40 determines that the intake pipe pressures $P_{1off}$, $P_{on}$ and $P_{2off}$ are not properly detected, followed by proceeding to step S114. That determination is made for the reason given below. The cancel determination value K is setted on the basis of the intake pipe pressure P resulting when the EGR off-control is executed in the state of the EGR valve 33 being stuck in the fully-open position. Therefore, when all of the components other than the EGR system 31 function normally, there is little likelihood of that the off-mode intake pipe pressures $P_{1off}$ and $P_{2off}$ exceed the cancel determination value K.

Coming in step S114 from step S104 or step S109, the ECU 40 resets all the detected values of the intake pipe pressures obtained at that time and cancels the current failure diagnosis process for the EGR system 31. Then, the ECU 40 proceeds to step S115 for the return to the normal EGR control, followed by exiting the routine.

With the embodiment described above, if at least one of the first off-mode intake pipe pressure $P_{1off}$ and the second off-mode intake pipe pressure $P_{2off}$ exceeds the cancel determination value K, the intake pipe pressures $P_{1off}$, $P_{on}$ and $P_{2off}$ are determined as being not properly detected, and the failure diagnosis of the EGR system 31 is canceled. Therefore, the false diagnosis of the EGR system 31 can be avoided with a simplified process without requiring specific determinations on the occurrence of individual abnormal states in the various components other than the EGR system 31.

In this connection, since the intake pipe pressures $P_{1off}$, $P_{on}$ and $P_{2off}$ having been improperly detected are excluded on the basis of the cancel determination it is sure that the respective intake pipe pressures P are properly detected at least during the period from the time of detecting the first off-mode intake pipe pressure $P_{1off}$ to the time of detecting the second off-mode intake pipe pressure $P_{2off}$ when those intake pipe pressures are determined to be not canceled. In such a case, therefore, by setting the failure determination value $P_0$ to a more critically (or a more strictly) defined value, the diagnosis of the EGR system 31 can be performed with the higher accuracy based on the diagnosis value $\Delta P$.

Further, since the cancel determination value K is setted on the basis of the intake pipe pressure P resulting when the EGR off-control is executed in the state of the EGR valve 33 being stuck in the fully-open position, each intake pipe pressure having been improperly detected can be reliably excluded.

The above embodiment has been described, by way of example, in connection with the case where the average value of the first off-mode intake pipe pressure $P_{1off}$ and the second off-mode intake pipe pressure $P_{2off}$ is computed as the off-mode intake pipe pressure $P_{off}$, and the difference between the off-mode intake pipe pressure $P_{off}$ and the on-mode intake pipe pressure $P_{on}$ is computed as the diagnosis value $\Delta P$. However, the present invention is of course not limited to that embodiment. For example, the difference between one of the first and second off-mode intake pipe pressures $P_{1off}$, $P_{2off}$ and the on-mode intake pipe pressure $P_{on}$ may be computed as the diagnosis value $\Delta P$.

Having described the preferred embodiments of the present invention referring to the accompanying drawings, it should be understood that the present invention is not limited to those precise embodiments and various changes and modifications thereof could be made by one skilled in the art without departing from the spirit or the scope of the invention as defined in the appended claims.

What is claimed is:

1. A diagnostic device for an exhaust gas recirculation apparatus with an EGR valve disposed in a recirculation pipe interconnecting an exhaust pipe and an intake pipe downstream of a throttle valve, comprising:
   EGR control means for selectively executing an EGR on-control to return an exhaust gas from said exhaust pipe to said intake pipe and an EGR off-control to cut off said return of said exhaust gas from said exhaust pipe to said intake pipe;
   diagnostic means for diagnosing a failure of said EGR system based on an intake pipe pressure during said EGR on-control and an intake pipe pressure during said EGR off-control when a diagnosis run condition is satisfied; and
   cancellation means for canceling diagnosis executed by said diagnostic means when said intake pipe pressure during the EGR off-control exceeds a presetted cancel determination value so as to easily and precisely perform to diagnose said failure.

2. The diagnostic device according to claim 1, wherein:
   said EGR control means successively executes said EGR off-control, said EGR on-control, and said EGR off-control when said diagnosis run condition is satisfied, and
   said cancellation means cancels said diagnosis executed by said diagnostic means when at least one of the intake pipe pressures during two steps of the EGR off-control exceeds said presetted cancel determination value.

3. The diagnostic device according to claim 1, wherein:
   said cancellation means sets a cancel determination value on the basis of said intake pipe pressure when said EGR off-control is executed in a state of said EGR valve being stuck to a fully-open position.

4. The diagnostic device according to claim 3, wherein:
   said EGR control means successively executes said EGR off-control, said EGR on-control, and said EGR off-control when said diagnosis run condition is satisfied, and
   said cancellation means cancels said diagnosis executed by said diagnostic means when at least one of the intake pipe pressures during two steps of the EGR off-control exceeds said presetted cancel determination value.

* * * * *